United States Patent [19]

Iwamura et al.

[11] Patent Number: 5,705,567
[45] Date of Patent: Jan. 6, 1998

[54] HIGH SOLIDS CONTENT RESIN COMPOSITION, HIGH SOLIDS CONTENT TYPE PAINT, AND PAINTING PROCESS USING THE SAME

[75] Inventors: Goro Iwamura; Shigeki Matsui; Ichiro Azuma, all of Osaka; Yoshiaki Marutani, Hiroshima; Hiroyuki Uemura, Hiroshima; Shinji Sasaki, Hiroshima; Kazuhi Koga, Hiroshima, all of Japan

[73] Assignees: Dainippon Ink and Chemicals, Inc., Tokyo; Mazda Motor Corporation, Hiroshima, both of Japan

[21] Appl. No.: 556,827

[22] Filed: Nov. 2, 1995

Related U.S. Application Data

[63] Continuation of Ser. No. 138,433, Oct. 20, 1993, abandoned.

[30] Foreign Application Priority Data

| Oct. 21, 1992 | [JP] | Japan | 4-283309 |
| Oct. 21, 1992 | [JP] | Japan | 4-283310 |
| Nov. 12, 1992 | [JP] | Japan | 4-302622 |

[51] Int. Cl.$^6$ .................. C09B 161/20; C09B 167/00; C09B 175/04
[52] U.S. Cl. .................. 525/127; 525/123; 525/160; 525/162; 525/328.8; 525/329.5; 525/518; 528/45; 528/60; 528/85; 528/272
[58] Field of Search .................. 528/45, 60, 85, 528/272; 525/123, 127; 325/160, 162, 518, 328.8, 329.5

[56] References Cited

U.S. PATENT DOCUMENTS

| 5,061,749 | 10/1991 | Ito | 525/123 |
| 5,290,602 | 3/1994 | Argropoulos | 524/462 |

FOREIGN PATENT DOCUMENTS

| 03250016 | 11/1991 | Japan | 525/127 |

*Primary Examiner*—Patricia A. Short
*Attorney, Agent, or Firm*—Armstrong, Westerman, Hattori, McLeland & Naughton

[57] ABSTRACT

There are disclosed a high solids content resin composition excellent in solubility in an organic solvent, comprising an acrylic oligomer having a blocked hydroxyl group, a curing agent having a reactivity with a hydroxyl group and a dissociation or curing catalyst, and a high solids content type paint using the resin composition. There are also disclosed a coating process and a baking process comprising coating and baking the resin composition or the paint while rotating a material to be coated at an appropriate speed. The resin composition and the paint of the present invention have substantially no sagging and solvent popping. Further, the thus obtained paint film have improved smoothness, solvent resistance, weather resistance and resistance to scratching.

6 Claims, No Drawings

HIGH SOLIDS CONTENT RESIN COMPOSITION, HIGH SOLIDS CONTENT TYPE PAINT, AND PAINTING PROCESS USING THE SAME

This application is a continuation of application Ser. No. 08/138,433 filed Oct. 20, 1993, now abandoned.

FIELD OF THE INVENTION

The present invention relates to a novel and useful high solids content resin composition, a high solids content type paint, and the coating process and baking process for the paint. In particular, the present invention relates to a high solids content resin composition and a high solids content type paint each comprising a specific acrylic oligomer having a blocked hydroxyl group, a hydroxyl group reactive curing agent, and a dissociation catalyst or a curing catalyst as the basic components and further comprising a specific polyester oligomer or a specific acid anhydride group-containing compound and a specific epoxy resin; and to a painting process for a paint, including a coating step and baking step in 1 coat 1 bake (hereinafter abbreviated to 1C-1B), 2 coat 1 bake (hereinafter abbreviated to 2C-1B), 2 coat 2 bake (hereinafter abbreviated to 2C-2B), 3 coat 2 bake (hereinafter abbreviated to 3C-2B), and overcoat systems, in which when there are coated and baked a high solids resin composition and high solids content type paint mainly comprising the low viscosity acrylic oligomer thus obtained having the form in which a hydroxyl group is blocked with a specific compound, a material to be coated is rotated around a horizontal axis to thereby prevent sagging.

BACKGROUND OF THE INVENTION

In recent years, in an automobile outside plate coating, a line coating is carried out with a 2C-1B finishing in the form of the combination of acryl polyol with a melamine resin. A lot of a solvent is released to air from this line coating, and in addition, there used to be involved the problem that an earth warming phenomenon attributable to the generation of a lot of carbon dioxide is accelerated as well by subjecting this discharged solvent to a burning treatment.

A shift to an aqueous coating is widely investigated with mainly a base coat. In a clear coat, a high quality appearance and various high grade performances for a paint film such as a durability are required.

A water base paint, a powder paint, and a UV-curing series paint have widely been investigated. It may be said that a solvent reduction in a conventional type resin will be the shortest way.

However, in the case where a shift to a lower molecular weight is carried out in order to attempt a shift to a high solids content in the combination of a conventional acryl polyol-melamine resin, the content of a hydroxyl group has to be raised in order to cover a curing shortage. A shift to a low viscosity can not necessarily be achieved with this means, and in addition, a paint obtained by curing a resin having a high hydroxyl number with a melamine resin brings about the result that a resistance to acid is extremely lowered. In addition thereto, there was involved the inconvenience that the shift to a low viscosity was accompanied with the notable generation of sagging on a vertical plane in coating.

SUMMARY OF THE INVENTION

Accordingly, the objects of the present invention are to provide a resin composition which solves such various problems in the conventional techniques as described above to achieve the improvements in a resistance to acid in a low viscosity and a resistance to scratching and causes no solvent popping (pinhole) or sagging, and to provide a very useful coating process and baking process by which such various performances and various characteristics are improved.

The investigations diligently made by the present inventors in line with the objects of the present invention as described above have resulted in getting the knowledge that the shift to a low viscosity can be achieved by the method in which a glass transition point is lowered together with the shift to a low molecular weight.

That is, the present inventors have come to complete the present invention by finding that a paint film having a low viscosity and free from solvent popping and sagging can be obtained by using (i) a specific high solids content resin composition comprising an acrylic oligomer (a) having a blocked hydroxyl group in order to reduce the polarity of a low molecular weight acrylic resin, a number-average molecular weight of 1,500 or less, and a hydroxyl group concentration after dissociation of 2.2 mole/1,000 g or more [hereinafter abbreviated to the acrylic oligomer (a)], a curing agent (b) having a reactivity with a hydroxyl group [hereinafter abbreviated to the curing agent (b)], and a dissociation or curing catalyst (c) [hereinafter abbreviated to the dissociation or curing catalyst (c)]; or (ii) a specific high solids content resin composition basically comprising the acrylic oligomer (a), the curing agent (b), and the dissociation or curing catalyst (c) as described above, and further comprising a polyester oligomer (d) having a number-average molecular weight of 1,500 or less and a hydroxyl group concentration of 2.0 mole /1,000 g or more [hereinafter abbreviated to the polyester oligomer (d)]; or (iii) a specific high solids content resin composition basically comprising the acrylic oligomer (a), the curing agent (b), and the dissociation or curing catalyst (c) as described above, and further comprising an acid anhydride group-containing compound (e) having a number-average molecular weight of 1,500 or less [hereinafter abbreviated to the acid anhydride group-containing compound (e)], and an epoxy compound (f) having a number-average molecular weight of 1,500 or less [hereinafter abbreviated to the epoxy compound (f)]; or (iv) a high solids content type paint using the resin composition (i), (ii) or (iii) described above.

In other words, the present invention is to provide:

(1) a high solids content resin composition comprising, as essential components, the acrylic oligomer (a), the curing agent (b), and the dissociation or curing catalyst (c);

(2) a high solids content resin composition comprising, as essential components, the acrylic oligomer (a), the curing agent (b), the dissociation or curing catalyst (c), and the polyester oligomer (d); and (3) a high solids content resin composition comprising, as essential components, the acrylic oligomer (a), the curing agent (b), the dissociation or curing catalyst (c), the acid anhydride group-containing compound (e), and the epoxy compound (f).

Further, the present invention is to provide:

(4) a high solids content type paint using, as a binder, a high solids content resin composition comprising, as essential components, the acrylic oligomer (a), the curing agent (b), and the dissociation or curing catalyst (c);

(5) a high solids content type paint using, as a binder, a high solids content resin composition comprising, as essential components, the acrylic oligomer (a), the curing agent (b), the dissociation or curing catalyst (c), and the polyester oligomer (d); and (6) a high solids content type paint using, as a binder, a high solids content resin composition comprising, as essential components, the acrylic oligomer (a), the curing agent (b), the dissociation or curing catalyst (c), the acid anhydride group-containing compound (e), and the epoxy compound (f).

Furthermore, the present invention is to provide:

(7) a painting process for a paint in 1C-1B, 2C-1B, 2C-2B, 3C-2B, and overcoat systems, comprising the step of coating a high solids content resin composition comprising, as essential components, the acrylic oligomer (a), the curing agent (b), and the dissociation or curing catalyst (c) or a high solids content type paint using the above high solids content resin composition as a binder on a material to be coated, wherein the coating step includes rotating the material to be coated around a horizontal axis for a period of at least before sagging of the coated paint starts generating and until sagging of the coated paint stops generating to thereby carry out painting with substantially no sagging;

(8) a painting process for a paint in 1C-1B, 2C-1B, 2C-2B, 3C-2B, and overcoat systems, comprising the step of coating a high solids content resin composition comprising, as essential components, the acrylic oligomer (a), the curing agent (b), the dissociation or curing catalyst (c), and the polyester oligomer (d) or a high solids content type paint using the above high solids content resin composition as a binder on a material to be coated, wherein the coating step includes rotating the material to be coated around a horizontal axis for a period of at least before sagging of the coated paint starts generating and until sagging of the coated paint stops generating to thereby carry out coating with substantially no sagging; and (9) a painting process for a paint in 1C-1B, 2C-1B, 2C-2B, 3C-2B, and overcoat systems, comprising the step of coating a high solids content resin composition comprising, as essential components, the acrylic oligomer (a), the curing agent (b), the dissociation or curing catalyst (c), the acid anhydride group-containing compound (e), and the epoxy compound (f) or a high solids content type paint using the above high solids content resin composition as a binder on a material to be coated, wherein the coating step includes rotating the material to be coated around a horizontal axis for a period of at least before sagging of the coated paint starts generating and until sagging of the coated paint stops generating to thereby carry out coating with substantially no sagging.

Furthermore, the present invention provides:

(10) a painting process for a paint in 1C-1B, 2C-1B, 2C-2B, 3C-2B, and overcoat systems, comprising the steps of:
coating a high solids content resin composition comprising, as essential components, the acrylic oligomer (a), the curing agent (b), and the dissociation or curing catalyst (c) or a high solids content type paint using the above high solids content resin composition as a binder on a material to be coated; and then
baking the coated paint;
wherein the coating step and baking step each includes rotating the material to be coated around a horizontal axis for a period of at least before sagging of the coated paint starts generating and until sagging of the coated paint stops generating to thereby carry out painting with substantially no sagging;

(11) a painting process for a paint in 1C-1B, 2C-1B, 2C-2B, 3C-2B, and overcoat systems, comprising the steps of:
coating a high solids content resin composition comprising, as essential components, the acrylic oligomer (a), the curing agent (b), the dissociation or curing catalyst (c), and the polyester oligomer (d) or a high solids content type paint using the above high solids content resin composition as a binder on a material to be coated; and then
baking the coated paint;
wherein the coating step and baking step each includes rotating the material to be coated around a horizontal axis for a period of at least before sagging of the coated paint starts generating and until sagging of the coated paint stops generating to thereby carry out painting with substantially no sagging; and

(12) a painting process for a paint in 1C-1B, 2C-1B, 2C-2B, 3C-2B, and overcoat systems, comprising the steps of:
coating a high solids content resin composition comprising, as essential components, the acrylic oligomer (a), the curing agent (b), the dissociation or curing catalyst (c), the acid anhydride group-containing compound (e), and the epoxy compound (f) or a high solids content type paint using the above high solids content resin composition as a binder on a material to be coated; and then
baking the coated paint;
wherein the coating step and baking step each includes rotating the material to be coated around a horizontal axis for a period of at least before sagging of the coated paint starts generating and until sagging of the coated paint stops generating to thereby carry out painting with substantially no sagging.

DETAILED DESCRIPTION OF THE INVENTION

In the present invention, the "number-average molecular weight" is determined by using Liquid Chromatograph LC-80 (manufactured by Japan Analytical Industry, Co., Ltd.).

In the present invention, the blocked hydroxyl group represents those represented by formulae (I), (II) and (III):

wherein $R_1$ and $R_2$, which may be the same or different, each represents an alkyl group having 1 to 18 carbon atoms, a phenyl group, an aryl group, a hydrogen atom, a chlorine atom, or a fluorine atom; and $R_3$ represents an alkyl group having 1 to 18 carbon atoms, a phenyl group, or an aryl group;

wherein $R_4$ represents a hydrogen atom or an alkyl group having 1 to 10 carbon atoms; and $R_5$ represents an alkyl group having 1 to 22 carbon atoms, which is substituted with at least one kind of an atomic group selected from the group consisting of a cycloalkyl group, an aralkyl group, an aryl group, an alkoxyl group, an alkanoyloxy group, an alkyl group having 1 to 18 carbon atoms, and a halogen atom;

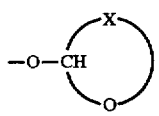

(III)

wherein X represents an alkylene group having 1 to 18 carbon atoms, which may be substituted with at least one kind of an atomic group selected from the group consisting of an alkoxyl group, an aralkyl group, an aryl group, an aryloxy group, an alkanoyloxy group, an alkyl group having 1 to 10 carbon atoms, and a halogen atom.

In the present invention, the term "hydroxyl group concentration after dissociation of 2.2 mole/1,000 g or more" means the mole number of a hydroxyl group present in 1,000 g of the acrylic oligomer and indicates that it has the present amount, that is, the present concentration of 2.2 mole or more in the oligomer of 1,000 g.

To exemplify only those which are particularly representative as the monomers having the structure represented by formula (I) shown above, they are trimethylsiloxyethyl (meth)acrylate, trimethylsiloxypropyl (meth)acrylate, trimethylsiloxybutyl (meth)acrylate, triethylsiloxyethyl (meth) acrylate, and tributylsiloxypropyl (meth)acrylate, and in addition, triphenylsiloxyalkyl (meth)acrylates, and dimethyl-tert-butyl-siloxyalkyl (meth)acrylates.

That is, they have the form in which a hydrogen atom of a hydroxyl group present in the hydroxyl group-containing polymerizable unsaturated monomers is blocked with a so-called silylation agent but the present invention will not be limited to the monomers shown above.

In other words, there can be used as well those obtained by subjecting ε-caprolactone to an addition reaction with N-methylolated (meth)acrylamide and β-hydroxyethyl (meth)acrylate and those obtained by subjecting various (meth)acrylates of polyoxyalkylene glycols to a silylation.

To exemplify only those which are particularly representative as the monomers having the structure shown by formula (II) shown above, they are various 1-alkoxy-ethoxyethyl (meth)acrylates such as 1-methoxy-ethoxyethyl (meth)acrylate, 1-ethoxy-ethoxyethyl (meth)acrylate, 1-butoxy-ethoxyethyl (meth)acrylate, 1-(2-ethylhexanoxy)-ethoxyethyl (meth)acrylate, 1-isobutoxy-ethoxyethyl (meth) acrylate, and 1-cyclohexyloxy-ethoxyethyl (meth)acrylate.

That is, they have the form in which a hydrogen atom of a hydroxyl group present in the hydroxyl group-containing polymerizable unsaturated monomers is subjected to an addition reaction with alkylvinyl ethers but the present invention will not be limited to the monomers shown above.

In other words, there can be used as well those obtained by subjecting ε-caprolactone to an addition reaction with N-methylolated (meth)acrylamide and β-hydroxyethyl (meth)acrylate and those obtained by subjecting various vinyl ethers to an addition reaction with various (meth) acrylates of polyoxyalkylene glycols.

To exemplify only those which are particularly representative as the monomers having the structure shown by formula (III) shown above, they are those represented by the following chemical structures:

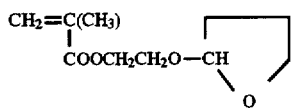

[III-1]

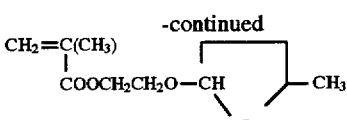

[III-2]

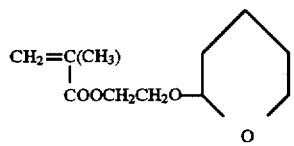

[III-3]

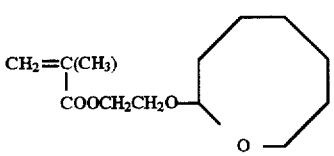

[III-4]

The carbon atom number of X in formula (III) resides in the range of 1 to 18, preferably in the range of 2 to 6.

The use amount of the monomers having the blocked hydroxyl group falls suitably in the range of 0.5 mole/1,000 g to 4 mole/1,000 g. In the case where it is less than 0.5 mole/1,000 g, the effect of a shift to a low viscosity becomes small. Meanwhile, in the case where it exceeds 4 mole/1,000 g, the increase in a volatile content due to a blocking agent rather than the effect of the shift to a low viscosity is brought about. Accordingly, either case is not preferred.

Further, the polymerizable monomers having a hydroxyl group itself which is not blocked, i.e., the monomers having a non-blocked hydroxyl group can be used. Above all, the monomers having a good solubility is preferably used.

To exemplify only those which are particularly representative as these monomers, they are the compounds obtained by subjecting 1 to 6 moles of ε-caprolactone to an addition reaction with β-hydroxyethyl (meth)acrylate, and (meth) acrylates of polyoxyalkylene glycol; various (meth)acrylates such as hydroxyethyl acrylate, 3-hydroxypropyl (meth) acrylate, 4-hydroxybutyl (meth)acrylate, and 2,3-dihydroxypropyl (meth)acrylate; various vinyl ethers such as hydroxyethyl vinyl ether and hydroxybutyl vinyl ether; various allyl compounds such as allyl ether and hydroxyethyl allyl ether; monomers obtained by reacting glycidyl (meth)acrylate with oxycarboxylic acids; monomers obtained by reacting (meth)acrylic acid with a compound having one epoxy group; oligomers obtained by reacting epoxy group-containing oligomers with fatty acid and hydroxy acid; and monomers obtained by reacting carboxylic acid-containing oligomers with a compound having one epoxy group.

It is preferred that a ratio of a concentration of the blocked hydroxyl group to that of the non-blocked hydroxyl group is 50% or more.

The total use amount of the monomers having a blocked hydroxyl group and the monomers having a non-blocked hydroxyl group shown above is suitably 2.2 mole/1,000 g or more, preferably 2.8 mole/1,000 g or more in terms of the concentration of the hydroxyl group after dissociation. In case of less than 2.2 mole/1,000 g, a paint film having a sufficient cross linking density can not be obtained and therefore it is not preferred. To exemplify only those which are particularly representative as the other monomers copolymerizable with the monomers shown above, they are various alkyl (meth)acrylates which are esters of monohydric alcohols having the carbon atom number of 1 to 22 and (meth)acrylic acid, styrene, vinyltoluene, tert-butylstyrene, various alkyl acid esters such as glycidyl (meth)acrylate, 2-ethoxyethyl (meth)acrylate, (meth)acrylonitrile, and cyclohexyl (meth)acrylate; various unsaturated carboxylic acids such as (meth)acrylic acid, crotonic acid, maleic acid, fumaric acid, and itaconic acid; mono- or di-esters of maleic acid or fumaric acid and monohydric alcohols having the carbon atom number of 1 to 22; various N,N-dialkylaminoalkyl (meth)acrylates such as (meth) acrylamide, (metha)dimethylacrylamide, N,N-dimethylaminoethyl methacrylate, and N,N-diethylaminoethyl methacrylate; various phosphoric acid group-containing (meth)acrylates such as phosphonooxyethyl (meth)acrylate; α-olefins such as vinyl acetate, hexafluoropropylene, and tetrafluoroethylene; perfluoroalkyl perfluorovinyl ethers such as trifluoromethyl trifluorovinyl ether and pentafluoroethyl trifluorovinyl ether; and the compounds including (per)fluorovinyl ethers and perfluoroalkyl vinyl ether (provided that the carbon atom number of the alkyl group will fall within the range of 1 to 18).

These vinyl series monomers may naturally be used singly or in combination of two or more kinds according to a desired film performance.

The number-average molecular weight of the acrylic oligomer obtained by copolymerizing the various components shown above falls within the range of 1,500 or less, preferably of 700 to 1200. In the case where it exceeds 1,500, a solubility or a viscosity in the condition of no solvent extremely increases, which is accompanied with the extreme increase in the amount of a diluting solvent, and therefore it is not preferred.

The polymerization of these monomers can be carried out by the conventional processes. It can readily be carried out preferably by a radical solution polymerization process. With respect to the process by which a low molecular weight polymer is obtained, an aimed acrylic oligomer having a blocked hydroxyl group can readily be obtained by the process in which there are used various chain transfer agents including a mercaptan compound such as mercaptoethanol, thioglycerol, and laurylmercaptan, or the process in which a reaction is carried out at a high temperature (usually, in the range of 140° to 180° C.) or at a low monomer concentration.

To exemplify only those which are particularly representative as solvents, there can be used arbitrary solvents which are used for manufacturing a conventional acrylic polymer, such as xylene, "Solvesso" (trade name; the product of Exxon Co., Ltd.), butyl acetate, methyl ethyl ketone, methyl amyl ketone, butyl acetate, and ethyl acetate.

In the case where a melamine resin is used as one of the hydroxyl group reactive curing agents (b), there can be used as well an alcohol series solvent such as n-butanol, isobutanol, and butyl cellosolve.

The radical polymerization initiators can be used as well as long as they are usually used. To exemplify only those which are particularly representative of them, they are various peroxides such as benzoyl peroxide, lauroyl peroxide, tert-butyl hydroperoxide, tert-butylperoxy-2-ethylhexanoate, tert-amylperoxy-2-ethylhexanoate, and tert-amylperoxy benzoate; and various azo compounds such as azobisisobutyronitrile and azobis(2-methylpropionitrile).

Further, the process by a so-called ion polymerization such as an anion polymerization and a cation polymerization can particularly advantageously be used for the copolymerization of the monomers having a blocked hydroxyl group.

Firstly, the polyisocyanate compounds can be enumerated as the curing agent (b) having a reactivity with a hydroxyl group (a hydroxyl group reactive curing agent) used in the present invention. To enumerate only those which are particularly representative of them, they are various alkylenediisocyanate compounds such as xylenediisocyanate, isophoronediisocyanate, hydrogenated xylenediisocyanate, tolylenediisocyanate, hexamethylenediisocyanate, 1,4-tetramethylenediisocyanate, 1,10-decamethylenediisocyanate, and 1,18-octadecamethylenediisocyanate; the addition products of such various alkylenediisocyanate compounds and various polyhydric alcohols such as ethylene glycol, glycerine, and trimethylolpropane; and those reactive to a so-called active hydrogen and having a free isocyanate group, such as the reaction product of 1 mole of water and 3 moles of diisocyanate. Any of the conventional products can be used as long as they have such the forms.

The most useful as a polyisocyanate compound in the present invention is that having an isocyanurate ring and it is advantageous for a hardness and a low viscosity.

Second important as the hydroxyl group reactive curing agent (b) is an alkylated melamine-formaldehyde resin and the carbon atom number of the above alkyl group falls usually within the range of 1 to 4.

That is, it is that obtained by partially or entirely etherifying with so-called lower alcohol of $C_1$ to $C_4$. To be concrete, it is methyl-etherified melamine, n-butyl etherified melamine, or iso-butyl-etherified melamine. Of them, methyl etherified melamine is preferably used from a viewpoint of a higher solids content.

Polyisocyanates obtained by blocking a so-called non-yellowing polyisocyanate with a conventional blocking agent can be used as blocked polyisocyanate. Of them, the representative commercially available products are "Burnock D-550" (trade name; the product of Dainippon Ink and Chemicals, Inc.), "Takenate B815-N" (trade name; the product of Takeda Chemical industries, Ltd.), and "Additol VKL-80" (trade name; the product of Hoechst Gosei K. K.).

Next, the acid anhydride group-containing compound can be enumerated. The acid anhydride group-containing vinyl series copolymers obtained by co-polymerizing the acid anhydride group-containing unsaturated monomers with the polymerizable monomers shown above are particularly representative as such the compound.

To enumerate only those which are particularly representative as the acid anhydride group-containing unsaturated monomers called herein, they are those represented by itaconic anhydride or maleic anhydride. Further, to enumerate only those which are particularly representative as the acid anhydride group-containing low molecular compounds, they are trimellitic acid, tetrahydrophthalic anhydride, hetic anhydride, himic anhydride, maleic anhydride, iraconic anhydride, pyromellitic anhydride, and glycerol tris (trimellitate).

The dissociation catalyst or curing catalyst (c) in the present invention represents those which are hydrolyzed by the reaction with water in air to reproduce a hydroxyl group. It goes without saying that the acceleration of such the hydrolysis requires to use a catalyst. To enumerate only those which are particularly representative as such the catalyst, they are various acid catalysts such as phosphoric acids, phosphoric esters, phosphorous esters, unsaturated group-containing phosphoric esters, p-toluenesulfonic acid or amine salts thereof, benzoic acid, trichloroacetic acid, and naphthalenedisulfonic acid or amine salts thereof, and tetraethylammonium chloride. Further, the compounds generating a halogen ion such as chloride are effective.

The addition amount of these catalysts falls preferably within the range of 0.001 to 10% by weight, more preferably 0.005 to 6% by weight, based on the amount of the acrylic oligomer.

Anyone can be used as the catalyst for accelerating the reaction of a generated hydroxyl group with the above mentioned polyisocyanate compound which is a curing agent without a specific limitation as long as it is usually used as a urethane catalyst.

To enumerate only those which are particularly representative as such the urethane catalyst, they are metal salts of various carboxylic acids, such as an alkyl titanic acid salt, an octylic acid salt, dibutyl tin dilaurate, and lead octylate; and various sulfide type or mercaptide type organic tin compounds such as monobutyl tin sulfide and dioctyl tin mercaptide. The use amount thereof falls preferably within the range of 0.001 to 5% by weight, more preferably 0.005 to 2% by weight, based on the amount of the acrylic oligomer.

The polyester oligomer (d) to be called the fourth component in the present invention will be described.

The polyester oligomer (d) can be used in combination with the acrylic oligomer (a) having a blocked hydroxyl group to markedly improve a resistance to scratching, which is required to a paint film for an automobile.

To enumerate the concrete examples of such the polyester oligomer (d), there can be used various polybasic carboxylic acids represented by phthalic anhydride, hexahydrophthalic anhydride, succinic anhydride, isophthalic acid, terephthalic acid, 1,4-cyclohexanedicarboxylic acid, adipic acid, sebacic acid, dimer acid, maleic anhydride, and tetrahydrophthalic anhydride, various polyhydric alcohols represented by ethylene glycol, propylene glycol, dipropylene glycol, 1,3-butylene glycol, 1,4-butylene glycol, cyclohexanedimethanol, neopentyl glycol, hydrogenated bisphenol A, 1,6-hexanediol, glycerine, trimethylolethane, trimethylolpropane, and pentaerythritol, various fatty acids as a molecular weight controller, monobasic carboxylic acid such as benzoic acid, p-tert-butylbenzoic acid, and rosin, and "Cardura E10" (a mono-epoxy compound manufactured by Shell Co., Ltd., Netherlands), to synthesize the aimed hydroxyl group-containing polyester oligomer by the dehydration condensation reaction and addition reaction thereof.

The molecular weight of the polyester oligomer (d) is 1,500 or less, preferably 400 to 1,000 in terms of a number-average molecular weight. In the case where it exceeds 1,500, the viscosity of a resin composition obtained, in turn the viscosity of a paint obtained is unfavorably increased to an extreme in case of using in combination of the acrylic oligomer (a).

The use amount of the polyester oligomer (d) falls preferably within the range of 100% by weight or less, more preferably 5 to 30% by weight, based on the amount of the acrylic oligomer (a). The ratio of the acrylic oligomer (a) to the polyester oligomer (d) is preferably 95:5 to 50:50.

Next, the acid anhydride group-containing compound (e) to be called the fifth component for the high solids content resin composition of the present invention will be described.

The acid anhydride group-containing vinyl series copolymers obtained by copolymerizing the acid anhydride group-containing unsaturated monomers with the polymerizable monomers shown above are particularly representative as such the compound.

To exemplify only those which are particularly representative as the acid anhydride group-containing unsaturated monomers called herein, they are those represented by itaconic anhydride and maleic anhydride. Further, to enumerate only those which are particularly representative as the acid anhydride group-containing unsaturated monomer, they are trimellitic acid, tetrahydrophthalic anhydride, methylhexahydrophthalic anhydride, hetic anhydride, himic anhydride, maleic anhydride, itaconic anhydride, pyromellitic anhydride, and glycerol tris(trimellitate).

The unsaturated monomers copolymerizable with these acid anhydride group-containing unsaturated monomers are the same as the monomers copolymerizable with the blocked hydroxyl group-containing unsaturated monomers.

The number-average molecular weight of the acid anhydride group-containing vinyl series copolymers described above is 1,500 or less, preferably 1,200 or less. In the case where it exceeds 1,500, a solubility comes to be lowered to an extreme in the end, and therefore it is not preferred.

The use amount of the acid anhydride group-containing monomers is suitably 2.0 mole/1,000 g or more, that is, 2.0 mole or more per 1,000 g of the acid anhydride group-containing compound (e). Because in case of less than 2 mole/1,000 g, a sufficiently cross-linked paint film can by no means be obtained.

Further, the same can naturally be obtained as well from monocarboxylic acid copolymers represented by monoalkyl maleate or monoalkyl itaconate by a ring-closing reaction with a dealcohol reaction.

Further, the acid anhydride group-containing low molecular compounds shown below can be used as well. That is, to enumerate only those which are particularly representative of them, they are pyromellitic anhydride, benzophenonetetracarboxylic anhydride, ethylene glycol bis (anhydrotrimellitate), and glycerol tris(anhydrotrimellitate).

Next, the epoxy compound (f) to be called the sixth component for the high solids content resin composition of the present invention will be described. Such the compound includes polyglycidyl ethers of various polyhydric alcohols, such as ethylene glycol diglycidyl ether, neopentyl glycol diglycidyl ether, 1,6-hexanediol diglycidyl ether, diglycidyl ether of bisphenol A, and triglycidyl ether of glycerine; polyglycidyl esters of various polybasic carboxylic acids, such as phthalic acid diglycidyl ester, diglycidyl ester of isophthalic acid, and diglycidyl ester of adipic acid; and various epoxy resins such as a glycidyl ether type epoxy compound of bisphenol A or bisphenol F, a novolak type epoxy resin, and a hydantoin ring-containing epoxy resin.

Further, there can be used as well glycidyl ester ether of p-oxybenzoic acid or an alicyclic epoxy compound. There can be enumerated as the particularly representative alicyclic epoxy compound, "Celloxide 2021", "Celloxide 2080", "Celloxide 3000", or "Epolead GT-300" or "Epolead GT-400" (these are the multifunctional alicyclic epoxy compounds manufactured by DAICEL Chemical Industries, Ltd.).

Or, there can be used as well the copolymers of the epoxy group-containing polymerizable unsaturated monomers and the other copolymerizable monomers shown previously (copolymerizable unsaturated monomers).

To enumerate those which are particularly representative as the epoxy group-containing polymerizable unsaturated monomers called herein, they are glycidyl (meth)acrylate, the reaction product of isocyanateethyl (meth)acrylate and glycidol, (meth)acryloyloxymethyl-3,4-epoxycyclohexane, and vinylcyclohexene monoepoxide. They can be obtained by copolymerizing these epoxy group-containing polymerizable unsaturated monomers with various polymerizable unsaturated monomers shown above.

Usually, the number-average molecular weight of the epoxy compound (f) is preferably 1,500 or less. Because in the case where it exceeds 1,500, the solubility thereof in an organic solvent is inevitably lowered to an extreme, which in turn makes it impossible to obtain the aimed high solids content resin composition.

The use ratio of the acrylic oligomer (a), the hydroxyl group reactive curing agent (b), the acid anhydride group-containing compound (e), and the epoxy compound (f) is not specifically limited. The weight ratio of (a):(b):(e):(f) falls preferably within the range of 5 to 60:60 to 15:5 to 30:30 to 5.

Further, various conventional additives such as various resins and solvents, coloring agents such as various pigments and dyes, a fluidity controller, an anti-oxidation agent, a UV absorber, a light stabilizer, and a silane coupling agent can naturally be added to the high solids content resin composition or high solids content type paint of the present invention (hereinafter these both may be represented as a resin composition, or on the contrary, may be represented as a paint) according to necessity. In particular, the high hygroscopic, so-called polar aprotic solvents are effectively used as the solvents.

Next, there will be described a coating process and a baking process of a paint (including a resin composition in some cases) in the 1C-1B, 2C-1B, 2C-2B, 3C-2B, and overcoat systems.

The resin composition of the present invention is used in a condition of being diluted with a necessary minimum solvent or a solvent-free condition in coating. In the case where it is coated in any condition, a blocking agent is dissociated in an atomization condition in coating, and at the moment when it is coated on the material to be coated, a hydroxyl group is reproduced to rapidly develop a viscosity. Accordingly, it is hard to sag as compared with conventional ones which are shifted to a low viscosity only with solvents.

That is, in case of a paint containing a lot of solvents as is the case with a conventional technique, the rapid increase in a viscosity with which the evaporation of such the solvents is accompanied can prevent a so-called primary sagging in a coating process. However, in case of a high solids content resin composition or high solids content type paint with no solvent or a low solvent content as is the case with the present invention, there is always involved the risk that sagging is generated on a plane extending up and down in a material to be coated, that is, on a vertical plane from immediately after coating, which in turn brings about the inferiority of a film appearance (an appearance inferiority).

In that respect, coating is carried out while continuously rotating the material to be coated around a horizontal axis in the coating process of the present invention, and at least in a drying process, the rotation is consistently maintained until a paint does not generate sagging. Accordingly, a primary sagging is hard to take place and even if taking place, such the primary sagging can be flattened.

Accordingly, in order to prevent a so-called secondary sagging in a baking process, it is inevitably necessary to continuously maintain the operation of rotating the material to be coated around a horizontal axis in a coating through baking process, which is the characteristic of the coating process or baking process of the present invention.

The coating or baking process in which a coated material is rotated around a horizontal axis, which is used in the present invention, is disclosed in JP-A-3-165871 (the term "JP-A" as used herein means an unexamined published Japanese patent application), and the use of the resin composition or paint of the present invention can allow the effects thereof to further be expected.

The rotation of a coated material is set up in the range in which the rotating speed thereof is larger than a rotating speed at which the coated material is turned from a vertical condition at least to a horizontal condition before the composition of the present invention generates sagging due to a gravity and is smaller than a rotating speed at which the sagging of a paint is generated by a centrifugal force originating in the rotation.

With respect to the conditions in coating, a resin composition or a paint is heated or there can be blended immediately before coating, the acrylic oligomer (a), the hydroxyl group reactive curing agent (b), the dissociation catalyst or curing catalyst (c), and the polyester oligomer (d) in the composition of the present invention, and further the acid anhydride group-containing compound (e) and epoxy compound (f) as the alternative for the polyester oligomer (d) to carry out the coating by various methods such as an air spray coating and an airless coating.

Generally, coating is conducted under the temperature of from room temperature to 90° C., and then baking is conducted at 60° to 160° C. for 10 to 60 minutes.

The high solids content resin composition or high solids content type paint of the present invention, and the coating process and baking process of the present invention can be applied to so-called metal materials or metal products such as an automobile and construction-related materials.

Next, the present invention will more concretely be explained with Reference Examples, Examples, Comparative Examples, Application Examples, and Comparative Application Examples. In the following, part and % will entirely be a weight standard unless otherwise indicated.

REFERENCE EXAMPLE 1

(Preparation Example of an Acrylic Oligomer Having a Blocked Hydroxyl Group)

1,000 parts of Xylene were charged in a four neck flask equipped with a stirrer, an inert gas introducing port, a thermometer, and a cooler and heated to 140° C. Then, there were dropped the mixture consisting of 250 parts of trimethylsiloxyethyl methacrylate, 80 parts of styrene, 120 parts of Placcel FM-1 (the compound obtained by adding ε-caprolactone 1 mole to 2-hydroxyethyl methacrylate, manufactured by DAICEL Chemical Industries, Ltd.), and 50 parts of n-butyl acrylate, 500 parts of xylene, 30 parts of azobisisobutyronitrile, and 50 parts of tert-butylperoxy-2-ethylhexanoate over the period of 6 hours.

Further, the reaction was carried out at the same temperature for 5 hours to obtain a resin solution with a non-volatile content of 25%, and then xylene was distilled off under a reduced pressure. The resin thus obtained had a viscosity of 1,800 centipoise at 25° C. and a number-average molecular weight of 980 (hereinafter abbreviated to OHB-1).

REFERENCE EXAMPLE 2

(Preparation Example of an Acrylic Oligomer Having a Blocked Hydroxyl Group)

1,000 parts of methyl amyl ketone was charged in the same equipment as that used in Reference Example 1, and the experiment was carried out in the same manner as that in Reference Example 1, except that the components were changed to use 50 parts of styrene, 300 parts of trimethylsiloxybutyl acrylate, 100 parts of Placcel FM-1, and 50 parts of n-butyl methacrylate as a monomer mixture, to thereby obtain a resin solution.

The resin solution thus obtained had a non-volatile content of 27.8%, a viscosity of the resin of 1,900 centipoise after distilling the solvent off, and a number-average molecular weight of 880 (hereinafter abbreviated to OHB-2).

REFERENCE EXAMPLE 3

(Preparation Example of an Acrylic Oligomer Having a Blocked Hydroxyl Group)

100 parts of a sec-butyl-Li/benzene (20/80) solution were added to the mixture consisting of 350 parts of 1-methoxyethoxyethyl methacrylate subjected to a dehydration treatment, 100 parts of n-butyl methacrylate, and 50 parts of 2-ethylhexyl methacrylate by using the same equipment as that used in Reference Example 1, and stirring was applied at 25° C. for 2 hours. Then, 20 parts of hydrochloric acid-methanol were added and the solvent was removed, followed by carrying out a filtration, whereby there was obtained the solution of the resin having a number-average molecular weight of 1,000 and a viscosity of 1,800 centipoise (hereinafter abbreviated to OHB-3).

REFERENCE EXAMPLE 4

(Preparation Example of an Acrylic Oligomer Having a Blocked Hydroxyl Group)

There were charged in the same equipment as that used in Reference Example 3, the monomer mixture consisting of 250 parts of trimethylsiloxyethyl methacrylate subjected to the dehydration treatment and 250 parts of n-butyl methacrylate, and 200 parts of tetrahydrofuran subjected in advance to the dehydration treatment, and there was added thereto 10 parts of a green complex (Na-naphthalene) obtained by reacting naphthalene with metal sodium in the proportion of 1:1 in tetrahydrofuran, followed by stirring the solution for 2 hours to obtain the polymer having a number-average molecular weight of 1,500. Subsequently, 20 parts of methanol were added and the solution was sufficiently stirred, followed by distilling the solvent off, whereby the solvent-free type resin having a viscosity of 2,000 cps was obtained (hereinafter abbreviated to OHB-4).

REFERENCE EXAMPLE 5

(Preparation Example of an Acrylic Oligomer Having a Blocked Hydroxyl Group)

1,000 parts of xylene was charged in an autoclave with the capacity of 3 liters and setting was arranged so that no leaking was involved. After raising the temperature to 160° C., there was charged by pressure, the mixture consisting of 100 parts of styrene, 300 parts of n-butyl methacrylate, 600 parts of trimethylsiloxyethyl methacrylate, and 100 parts of di-tert-butylperoxide over the period of 5 hours. The reaction was further continued for 4 hours, and then xylene was distilled off, whereby there was obtained the acrylic oligomer having a viscosity of 2,200 centipoise under solvent-free state and a number-average molecular weight of 1,100 (hereinafter abbreviated to OHB-5).

REFERENCE EXAMPLE 6

(Preparation Example of an Acrylic Oligomer Having a Hydroxyl Group)

500 parts of xylene and 300 parts of n-butanol were charged, and the reaction was carried out in the same manner as that in Reference Example 1, except that the components were changed to use the mixture consisting of 100 parts of styrene, 60 parts of butyl acrylate, 195 parts of β-hydroxyethyl methacrylate, and 145 parts of Placcel FM-1, and 75 parts of tert-butylperoxy-2-ethylhexanoate, whereby the resin for comparison having a viscosity of 40 centipoise obtained after removing the solvent and a number-average molecular weight of 1,120 (hereinafter abbreviated to OH-1).

REFERENCE EXAMPLE 7

(Preparation Example of an Acrylic Oligomer Having a Hydroxyl Group)

A 10% aqueous solution of phosphoric acid was added to the blocked hydroxyl group-containing acrylic resin obtained in Reference Example 4, and the solution was sufficiently stirred. Then, a dehydration was carried out, whereby the acrylic resin for comparison having a viscosity of 40 centipoise and a number-average molecular weight of 1,200 (hereinafter abbreviated to OH-2).

REFERENCE EXAMPLE 8

(Preparation Example of a Polyester Oligomer Having a Hydroxyl Group)

550 parts of trimethylolpropane, 425 parts of 1,4-cyclohexane-dicarboxylic acid, and 550 parts of 1,6-hexanediol were charged in a four neck flask equipped with a stirrer, an inert gas introducing port, and an air condenser, and after raising the temperature to 140° C., the temperature was gradually increased to 160° C. over the period of 3 hours to carry out a dehydration condensation reaction, followed by raising the temperature to 220° C., whereby there was obtained the polyester oligomer having a number-average molecular weight of 850, a hydroxyl number of 180, and an acid number of 2 (hereinafter abbreviated to PE-1).

REFERENCE EXAMPLE 9

(Preparation Example of a Polyester Oligomer Having a Hydroxyl Group)

The same equipment as that used in Reference Example 8 was used to charge therein 150 parts of melamine and 500 parts of butanol, and after raising the temperature to 120° C., 1.0 part of triphenylphosphine and 720 parts of Cardura E-10 were dropped, followed by carrying out the reaction for 7 hours, whereby there was obtained the triazine group-containing oligomer having a number-average molecular weight of 1,180 and a hydroxyl number of 200 (hereinafter abbreviated to PE-2).

REFERENCE EXAMPLE 10

(Preparation Example of a Polyester Oligomer Having a Hydroxyl Group)

The same equipment as that used in Reference Example 8 was used to charge therein 250 parts of pentaerythritol, 550 parts of ε-caprolactone, and 2 parts of acetylacetone zinc salt, and the reaction was carried out at 160° C. for 4 hours until it was confirmed that the system became homogeneous. The oligomer thus obtained had a number-average molecular weight of 720 and a hydroxyl number of 250 (hereinafter abbreviated to PE-3).

REFERENCE EXAMPLE 11

(Preparation Example of an Acrylic Resin Having an Acid Anhydride Group)

The same equipment as that used in Reference Example 1 was used to charge therein 500 parts of n-butyl acetate and 500 parts of xylene, and after raising the temperature to 120° C., there was dropped the mixture consisting of 200 parts of xylene, 170 parts of maleic anhydride, 230 parts of 2-ethylhexyl acrylate, 100 parts of n-butyl methacrylate, 200 parts of n-butyl acetate, 100 parts of tert-butylperoxy-2-ethylhexanoate, and 10 parts of azobisisobutyronitrile over the period of 7 hours. Then, the reaction was further continued for 3 hours and the solvent was removed under a reduced pressure, whereby there was obtained the oligomer having a non-volatile content of 99%, a viscosity of 4,500 cps, and a number-average molecular weight of 1,400 (hereinafter abbreviated to AN-1).

REFERENCE EXAMPLE 12

(Preparation Example of an Acrylic Resin Having an Acid Anhydride Group)

The experiment was carried out in the same manner as that in Reference Example 8, except that the components were changed to use the monomer mixture consisting of 130 parts of styrene, 150 parts of itaconic anhydride, 150 parts of maleic anhydride, and 170 parts of n-butyl acrylate, 200 parts of xylene, and 200 parts of n-butyl acetate, whereby there was obtained the acrylic oligomer having a non-volatile content of 99.8%, a viscosity of 5,200 cps, and a number-average molecular weight of 1,200 (hereinafter abbreviated to AN-2).

REFERENCE EXAMPLE 13

(Preparation Example of an Acrylic Resin Having an Epoxy Group)

2,300 parts of xylene were charged in the same equipment as that used in Reference Example 8, and after raising the temperature to 135° C., there was dropped the monomer mixture consisting of 150 parts of tert-butylperoxy-2-ethylhexanoate, 330 parts of xylene, 200 parts of styrene, 426 parts of glycidyl methacrylate, 200 parts of 2-ethylhexyl acrylate, and 174 parts of trimethylsiloxyethyl methacrylate over the period of 10 hours. Subsequently, the same procedure as that in Reference Example 8 was repeated, whereby there was obtained the acrylic oligomer having a non-volatile content of 99.5%, a viscosity of 3,500 cps, and a number-average molecular weight of 1,150 (hereinafter abbreviated to EP-1).

EXAMPLES 1 TO 6

The respective resins obtained in Reference Examples 1 to 7 were used to obtain the resin compositions of the present invention according to the blending composition ratios shown in Table 1.

COMPARATIVE EXAMPLES 1 AND 2

The respective resins obtained in Reference Examples 6 and 7 were used to obtain the resin compositions for comparison according to the blending composition ratios shown in Table 1.

TABLE 1

| | Example | | | | | | Comparative Example | |
|---|---|---|---|---|---|---|---|---|
| | 1 | 2 | 3 | 4 | 5 | 6 | 1 | 2 |
| Resin (OHB-1) | 1000 | | | | | 500 | | |
| Resin (OHB-2) | | 1000 | | | | | | |
| Resin (OHB-3) | | | 1000 | | | 500 | | |
| Resin (OHB-4) | | | | 1000 | | | | |
| Resin (OHB-5) | | | | | 1000 | | | |
| Resin (OH-1) | | | | | | | 1000 | |
| Resin (OH-2) | | | | | | | | 1000 |
| Curing agent | | | | | | | | |
| DN-901S | 585 | | 292 | | | 590 | 720 | |
| BO-357 | | 1920 | | 1400 | 858 | | | 1730 |
| HMMM | | | 228 | | 328 | | | |

TABLE 1-continued

| | Example | | | | | | Comparative Example | |
|---|---|---|---|---|---|---|---|---|
| | 1 | 2 | 3 | 4 | 5 | 6 | 1 | 2 |
| Dissociation catalyst | | | | | | | | |
| (C-1) | 23 | 58 | | 48 | 33 | | | |
| (C-2) | | | 15 | | | 24 | | |
| Curing catalyst | | | | | | | | |
| (C-3) | | 1.0 | | 1.5 | 1.1 | 1.2 | | 1.5 |

Remarks for Table 1:

1. "DN-901S" is an abbreviation of Burnock DN-901S and a polyisocyanate resin manufactured by Dainippon Ink and Chemicals, Inc.
2. "BO-357" is an abbreviation of Burnock BO-357 and a blocked isocyanate resin manufactured by Dainippon Ink and Chemicals, Inc.
3. "HMMM" is an abbreviation of a hexamethoxymethyl-melamine compound.
4. Monoisopropyl ester of phosphoric acid was used as the dissociation catalyst (C-1).
5. Trifluoromethanesulfonic acid was used as the dissociation catalyst (C-2).
6. Di n-butyl tin dilaurate was used as the curing catalyst (C-3).

EXAMPLES 7 TO 12

The respective resins obtained in Reference Examples 1 to 5 or Reference Examples 8 to 10 were used to obtain the resin compositions of the present invention by an ordinary process according to the blending composition ratios shown in Table 2.

COMPARATIVE EXAMPLES 3 AND 4

The respective resins obtained in Reference Examples 6 and 7 or Reference Examples 8 to 10 were used to obtain the resin compositions for comparison by an ordinary process according to the blending composition ratios shown in Table 2.

TABLE 2

| | Example | | | | | | Comparative Example | |
|---|---|---|---|---|---|---|---|---|
| | 7 | 8 | 9 | 10 | 11 | 12 | 3 | 4 |
| Resin (OHB-1) | 500 | | | | | 200 | | |
| Resin (OHB-2) | | 800 | | | | | | |
| Resin (OHB-3) | | | 700 | | | 500 | | |
| Resin (OHB-4) | | | | 750 | | | | |
| Resin (OHB-5) | | | | | 900 | | | |
| Resin (PE-1) | 500 | | | 250 | | | | |
| Resin (PE-2) | | 200 | | | | 300 | | |
| Resin (PE-3) | | | 300 | | 100 | | | |
| Resin (OH-1) | | | | | | | 1000 | |
| Resin (OH-2) | | | | | | | | 1000 |
| Curing agent | | | | | | | | |
| DN-901S | 585 | | 292 | | | 590 | 720 | |
| BO-357 | | 1920 | | 1400 | 858 | | | 1730 |
| HMMM | | | 228 | | 328 | | | |

TABLE 2-continued

| | Example | | | | | | Comparative Example | |
|---|---|---|---|---|---|---|---|---|
| | 7 | 8 | 9 | 10 | 11 | 12 | 3 | 4 |
| Dissociation catalyst | | | | | | | | |
| (C-1) | 23 | 58 | | 48 | 33 | | | |
| (C-2) | | | 15 | | | 24 | | |
| Curing catalyst | | | | | | | | |
| (C-3) | | 1.0 | | 1.5 | 1.1 | 1.2 | | 1.5 |

EXAMPLES 13 TO 18

The respective resins obtained in Reference Examples 1 to 7 or Reference Examples 11 to 13 were used to obtain the resin compositions of the present invention according to the blending composition ratios shown in Table 3.

COMPARATIVE EXAMPLES 5 AND 6

The respective resins obtained in Reference Examples 6 and 7 were used to obtain the resin compositions for comparison according to the blending composition ratios shown in Table 3.

TABLE 3

| | Example | | | | | | Comparative Example | |
|---|---|---|---|---|---|---|---|---|
| | 13 | 14 | 15 | 16 | 17 | 18 | 5 | 6 |
| Resin (OHB-1) | 1000 | | | | | 500 | | |
| Resin (OHB-2) | | 1000 | | | | | | |
| Resin (OHB-3) | | | 1000 | | | | | |
| Resin (OHB-4) | | | | 500 | | | | |
| Resin (OHB-5) | | | | | 600 | | | |
| Resin (OH-1) | | | | | | | 1000 | |
| Resin (OH-2) | | | | | | | | 1000 |
| Resin (AN-1) | 400 | | 350 | | | | | |
| Resin (AN-2) | | 400 | | 400 | 500 | 400 | | |
| Resin (EP-1) | 500 | 630 | | | | 630 | | |
| EX-612 | | | 100 | 160 | 105 | | | |
| Curing agent | | | | | | | | |
| DN-901S | 620 | | 192 | | | 290 | 720 | |
| BO-357 | | 2050 | | 500 | 515 | | | 1730 |
| HMMM | | | 228 | | 262 | | | |
| Dissociation catalyst | | | | | | | | |
| (C-1) | 23 | 58 | | 48 | 33 | | | |
| (C-2) | | | 15 | | | 24 | | |
| Curing catalyst | | | | | | | | |
| (C-3) | | 1.0 | | 1.5 | 1.1 | 1.1 | | 1.5 |
| (C-4) | 10 | 10 | 12 | 10 | 10 | 10 | | |

Remarks for Table 3:
1. "EX-612" is an abbreviation of Denacol EX-612 and an epoxy compound manufactured by Ciba Geigy Co., Ltd.
2. 1-methylimidazole was used as the curing agent (C-4).

APPLICATION EXAMPLES 1 TO 6 AND

COMPARATIVE APPLICATION EXAMPLES 1 AND 2

The respective resin compositions obtained in Examples 1 to 6 and Comparative Examples 1 and 2 were subjected to the adjustment of a viscosity to 150 centipoise with the mixed solvent of xylene/n-butyl acetate (weight ratio=60/40) and the coating non-volatile contents in the respective compositions were measured. The results thereof are shown altogether in Table 4.

Next, these diluted compositions were used to carry out coating on a material to be coated while rotating it at the rotating speed of 10 rpm as described above.

After it was left as it was further rotated for 10 minutes, it was dried at 140° C. for 20 minutes to carry out baking. During the baking, the rotation was continued at the same speed for 10 minutes after it was put in a drying oven.

Meanwhile, the same diluted composition was used to carry out coating simply on a stationary vertical plane without rotating at all.

After naturally drying for 10 minutes, baking was carried out in a drier in a vertical status under the condition of 140° C./20 minutes.

The generating condition of solvent popping and a sagging situation were synthetically observed and evaluated. The results thereof are shown altogether in Table 4.

A cured and baked paint film was further subjected to the comparison and investigation of various performances. The results thereof are shown altogether in Table 4.

TABLE 4

|  | Application Example | | | | | | | |
|---|---|---|---|---|---|---|---|---|
|  | 1 | 2 | 3 | 4 | 5 | 6 | 1* | 2* |
| Coating non-volatile content (%) | 80.4 | 82.0 | 79.6 | 74.5 | 81.5 | 80.0 | 70.1 | 69.0 |
| Solvent popping critical film thickness (μm): | | | | | | | | |
| 1 | 63 | 60 | 63 | 66 | 70 | 65 | 35 | 40 |
| 2 | 35 | 28 | 33 | 40 | 35 | 30 | 14 | 25 |
| Sagging critical film thickness (μm): | | | | | | | | |
| 1 | 100 | 90 | 95 | 88 | 88 | 89 | 55 | 60 |
| 2 | 23 | 22 | 20 | 18 | 21 | 22 | 12 | 15 |
| Gloss | 99 | 95 | 92 | 98 | 99 | 98 | 91 | 88 |
| Hardness (pencil hardness) | F | H | H | F | HB | H | H | F |
| Erichsen value (mm) | 7< | 7< | 5.2 | 7< | 6.5 | 5.6 | 5.4 | 7< |
| Impact resistance | 50< | 50< | 30–40 | 50< | 50< | 40–50 | 20–30 | 50< |
| Xylene rubbing | Good | Good | Good | Good | Good | Good | Good | Good |
| Acid resistance | None | None | None | None | None | None | None | None |
| Alkali resistance | None | None | None | None | None | None | None | None |
| Scratching resistance (%) | 88 | 90 | 88 | 80 | 90 | 88 | 85 | 65 |
| Weather resistance | 95 | 92 | 92 | 88 | 90 | 88 | 90 | 88 |
| Storage stability: | | | | | | | | |
| Initial | 40 | 40 | 40 | 40 | 40 | 40 | 40 | 40 |
| After 2 days | 45 | 40 | 40 | 42 | 43 | 43 | Gel | 42 |

*Comparative

Remarks for Table 4:
1. Solvent popping critical film thickness 1: critical film thickness at which solvent popping is not generated when coating is carried out while rotating.
2. Solvent popping critical film thickness 2: critical film thickness at which solvent popping is not generated when coating is carried out on a stationary vertical plane.
3. Sagging critical film thickness 1: critical film thickness at which sagging is not generated when coating is carried out while rotating.
4. Sagging critical film thickness 2: critical film thickness at which sagging is not generated when coating is carried out on a stationary vertical plane.
5. Storage stability: represents a stability immediately after the resin composition (paint) is prepared (that is, an initial stability) and a stability after it is stored at 50° C. for 2 days; the numerals in the table represent the second number of Ford cup No. 4.
6. Gloss: represented by a 60° specular reflection (%).
7. Impact resistance: carried out with ½ inch notch and represented in terms of 500 g/cm.
8. Xylene rubbing: visually observed the surface condition of a paint film at the point of the rubbing frequency of 10 times.
9. Acid resistance: 0.5 ml of a 5% sulfuric acid aqueous solution was dropped at 60° C. and the surface of a paint film was visually judged.
10. Alkali resistance: after a paint was dipped in a 5% sodium hydroxide aqueous solution at a room temperature for 24 hours, the surface of paint film was visually judged.
11. Weather resistance: represented by a gloss maintaining rate (%) after an accelerated weathering test over 2,000 hours with a QUV panel.
12. Scratching resistance: represents a gloss retention after impregnation with a 5% cleanser aqueous solution and the rubbing frequency of 30 times.

APPLICATION EXAMPLES 7 TO 12 AND COMPARATIVE APPLICATION EXAMPLES 3 AND 4

The respective resin compositions obtained in Examples 7 to 12 and Comparative Examples 3 and 4 were subjected to the adjustment of a viscosity to 150 centipoise with the mixed solvent of xylene/n-butyl acetate (weight ratio=60/40) and the coating non-volatile contents in the respective compositions were measured. The results thereof are shown altogether in Table 5.

Next, these diluted compositions were used to carry out coating on a material to be coated while rotating it at the rotating speed of 10 rpm as described above. After it was left as it was further rotated for 10 minutes, it was dried at 140° C. for 20 minutes to carry out baking. During the baking, the rotation was continued at the same speed for 10 minutes after it was put in a drying oven.

Meanwhile, the same diluted composition was used to carry out coating simply on a stationary vertical plane without rotating at all. After naturally drying for 10 minutes, baking was carried out in a drier in a vertical status under the condition of 140° C./20 minutes.

The generating condition of solvent popping and a sagging situation were synthetically observed and evaluated. The results thereof are shown altogether in Table 5.

A cured and baked paint film was further subjected to the comparison and investigation of various performances. The results thereof are shown altogether in Table 5.

TABLE 5

| | Application Example | | | | | | | |
|---|---|---|---|---|---|---|---|---|
| | 7 | 8 | 9 | 10 | 11 | 12 | 3* | 4* |
| Coating non-volatile content (%) | 81.4 | 83.0 | 81.8 | 77.5 | 83.5 | 82.0 | 70.1 | 69.0 |
| Solvent popping critical film thickness (μm): | | | | | | | | |
| 1 | 60 | 60 | 65 | 70 | 74 | 69 | 35 | 40 |
| 2 | 35 | 25 | 30 | 38 | 33 | 32 | 14 | 25 |
| Sagging critical film thickness (μm): | | | | | | | | |
| 1 | 90 | 108 | 90 | 80 | 80 | 89 | 55 | 60 |
| 2 | 20 | 21 | 19 | 16 | 22 | 23 | 12 | 15 |
| Gloss | 100 | 98 | 96 | 100 | 100 | 99 | 91 | 88 |
| Hardness (pencil hardness) | F | H | H | F | HB | H | H | F |
| Erichsen value (mm) | 7< | 7< | 5.2 | 7< | 6.8 | 7.0 | 5.4 | 7< |
| Impact resistance | 50< | 50< | 40–50 | 50< | 50< | 50< | 20–30 | 50< |
| Xylene rubbing | Good | Good | Good | Good | Good | Good | Good | Good |
| Acid resistance | None | None | None | None | None | None | None | None |
| Alkali resistance | None | None | None | None | None | None | None | None |
| Scratching resistance (%) | 93 | 97 | 93 | 85 | 98 | 93 | 85 | 65 |
| Weather resistance | 93 | 90 | 91 | 86 | 88 | 86 | 90 | 88 |
| Storage stability: | | | | | | | | |
| Initial | 40 | 40 | 40 | 40 | 40 | 40 | 40 | 40 |
| After 2 days | 44 | 45 | 43 | 43 | 44 | 44 | Gel | 42 |

*Comparative

APPLICATION EXAMPLES 13 TO 18 AND COMPARATIVE APPLICATION EXAMPLES 5 AND 6

The respective resin compositions obtained in Examples 13 to 18 and Comparative Examples 5 and 6 were subjected to the adjustment of a viscosity to 150 centipoise with the mixed solvent of xylene/n-butyl acetate (weight ratio=60/40) and the coating non-volatile contents in the respective compositions were measured. The results thereof are shown altogether in Table 6.

Subsequently, coating, drying and baking were carried out in the same manner as in Application Examples 1 to 6 and Comparative Application Examples 1 and 2 while rotating or not rotating, except that the components were changed to use these diluted compositions.

The generating condition of solvent popping and a sagging situation were synthetically observed and evaluated. The results thereof are shown altogether in Table 6.

A cured and baked paint film was further subjected to the comparison and investigation of various performances. The results thereof are shown altogether in Table 6.

TABLE 6

| | Application Example | | | | | | | |
|---|---|---|---|---|---|---|---|---|
| | 13 | 14 | 15 | 16 | 17 | 18 | 5* | 6* |
| Coating non-volatile content (%) | 78.4 | 80.0 | 78.6 | 78.5 | 81.5 | 80.0 | 70.1 | 69.0 |
| Solvent popping critical film thickness (μm): | | | | | | | | |
| 1 | 60 | 58 | 60 | 64 | 75 | 69 | 35 | 40 |
| 2 | 30 | 25 | 30 | 40 | 37 | 35 | 14 | 25 |
| Sagging critical film thickness (μm): | | | | | | | | |
| 1 | 83 | 96 | 90 | 98 | 90 | 89 | 55 | 60 |
| 2 | 24 | 25 | 28 | 28 | 25 | 25 | 12 | 15 |
| Gloss | 101 | 96 | 95 | 99 | 101 | 99 | 91 | 88 |
| Hardness (pencil hardness) | H | H | H | H | F | H | H | F |
| Erichsen value (mm) | 7< | 7< | 5.2 | 7< | 6.0 | 5.0 | 5.4 | 7< |
| Impact resistance | 50< | 50< | 30–40 | 50< | 50< | 40–50 | 20–30 | 50< |
| Xylene rubbing | Good | Good | Good | Good | Good | Good | Good | Good |
| Acid resistance | None | None | None | None | None | None | None | None |
| Alkali resistance | None | None | None | None | None | None | None | None |
| Scratching resistance (%) | 90 | 92 | 90 | 85 | 92 | 90 | 89 | 65 |

TABLE 6-continued

|  | Application Example | | | | | | | |
|---|---|---|---|---|---|---|---|---|
|  | 13 | 14 | 15 | 16 | 17 | 18 | 5* | 6* |
| Weather resistance | 95 | 95 | 97 | 92 | 95 | 92 | 88 | 88 |
| Storage stability: | | | | | | | | |
| Initial | 30 | 30 | 30 | 30 | 30 | 30 | 30 | 30 |
| After 2 days | 45 | 44 | 45 | 46 | 48 | 46 | Gel | 42 |

*Comparative

While the invention has been described in detail and with reference to specific embodiments thereof, it will be apparent to one skilled in the art that various changes and modifications can be made therein without departing from the spirit and scope thereof.

What is claimed is:

1. A high solids content resin composition for baking and curing consisting essentially of an acrylic oligomer (a) having a blocked hydroxyl group, a number-average molecular weight of 1,500 or less and a hydroxyl group concentration after dissociation of 2.2 mole/1,000 g or more, a curing agent (b) having a reactivity with a hydroxyl group, and a dissociation or curing catalyst (c), wherein said acrylic oligomer (a) has a blocked hydroxyl group represented by formula (I), (II) or (III) and a ratio of a concentration of the blocked hydroxyl group to that of a non-blocked hydroxyl group is 50% or more;

wherein $R_1$ and $R_2$, which may be the same or different, each represents an alkyl group having 1 to 18 carbon atoms, a phenyl group, an aryl group, a hydrogen atom, a chlorine atom, or a fluorine atom; and $R_3$ represents an alkyl group having 1 to 18 carbon atoms, a phenyl group, or an aryl group;

wherein $R_4$ represents a hydrogen atom or an alkyl group having 1 to 10 carbon atoms; and $R_5$ represents an alkyl group having 1 to 22 carbon atoms, which is substituted with at least one kind of an atomic group selected from the group consisting of a cycloalkyl group, an aralkyl group, an aryl group, an alkoxyl group, an alkanoyloxy group, an alkyl group having 1 to 18 carbon atoms, and a halogen atom;

wherein X represents an aklylene group having 1 to 18 carbon atoms, which may be substituted with at least one kind of an atomic group selected from the group consisting of an alkoxyl group, an aralkyl group, an aryl group, an aryloxy group, an alkanoyloxy group, an alkyl group having 1 to 10 carbon atoms, and a halogen atom.

2. A high solids content resin composition as in claim 1, wherein said baking and curing is conducted at a temperature of about 60° C. to 160° C.

3. A high solids content paint for baking and curing consisting essentially of an acrylic oligomer (a) having a blocked hydroxyl group, a number-average molecular weight of 1,500 or less and a hydroxyl group concentration after dissociation of 2.2 mole/1,000 g or more, a curing agent (b) having a reactivity with a hydroxyl group, and a dissociation or curing catalyst (c), wherein said acrylic oligomer (a) has a blocked hydroxyl group represented by formula (I), (II) or (III) and a ratio of a concentration of the blocked hydroxyl group to that of a non-blocked hydroxyl group is 50% or more;

wherein $R_1$ and $R_2$, which may be the same or different, each represents an alkyl group having 1 to 18 carbon atoms, a phenyl group, an aryl group, a hydrogen atom, a chlorine atom, or a fluorine atom; and $R_3$ represents an alkyl group having 1 to 18 carbon atoms, a phenyl group, or an aryl group;

wherein $R_4$ represents a hydrogen atom or an alkyl group having 1 to 10 carbon atoms; and $R_5$ represents an alkyl group having 1 to 22 carbon atoms, which is substituted with at least one kind of an atomic group selected from the group consisting of a cycloalkyl group, an aralkyl group, an aryl group, an alkoxyl group, an alkanoyloxy group, an alkyl group having 1 to 18 carbon atoms, and a halogen atom;

wherein X represents an alkylene group having 1 to 18 carbon atoms, which may be substituted with at least one kind of an atomic group selected from the group consisting of an alkoxyl group, an aralkyl group, an aryl group, an aryloxy group, an alkanoyloxy group, an alkyl group having 1 to 10 carbon atoms, and a halogen atom.

4. A high solids content paint as in claim 3, wherein said baking and curing is conducted at a temperature of about 60° C. to 160° C.

5. A high solids content resin composition for baking and curing consisting of an acrylic oligomer (a) having a blocked hydroxyl group, a number-average molecular weight of 1,500 or less and a hydroxyl group concentration after dissociation of 2.2 mole/1,000 g or more, a curing agent (b) having a reactivity with a hydroxyl group, and a dissociation or curing catalyst (c), wherein said acrylic oligomer (a) has a blocked hydroxyl group represented by formula (I), (II) or (III) and a ratio of a concentration of the blocked hydroxyl group to that of a non-blocked hydroxyl group is 50% or more;

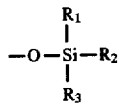
(I)

wherein $R_1$ and $R_2$, which may be the same or different, each represents an alkyl group having 1 to 18 carbon atoms, a phenyl group, an aryl group, a hydrogen atom, a chlorine atom, or a fluorine atom; and $R_3$ represents an alkyl group having 1 to 18 carbon atoms, a phenyl group, or an aryl group;

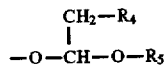
(II)

wherein $R_4$ represents a hydrogen atom or an alkyl group having 1 to 10 carbon atoms; and $R_5$ represents an alkyl group having 1 to 22 carbon atoms, which is substituted with at least one kind of an atomic group selected from the group consisting of a cycloalkyl group, an aralkyl group, an aryl group, an alkoxyl group, an alkanoyloxy group, an alkyl group having 1 to 18 carbon atoms, and a halogen atom;

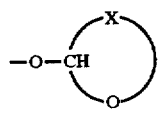
(III)

wherein X represents an alkylene group having 1 to 18 carbon atoms, which may be substituted with at least one kind of an atomic group selected from the group consisting of an alkoxyl group, an aralkyl group, an aryl group, an aryloxy group, an alkanoyloxy group, an alkyl group having 1 to 10 carbon atoms, and a halogen atom.

6. A high solids content paint for baking and curing consisting of an acrylic oligomer (a) having a blocked hydroxyl group, a number-average molecular weight of 1,500 or less and a hydroxyl group concentration after dissociation of 2.2 mole/1,000 g or more, a curing agent (b) having a reactivity with a hydroxyl group, and a dissociation or curing catalyst (c), wherein said acrylic oligomer (a) has a blocked hydroxyl group represented by formula (I), (II) or (III) and a ratio of a concentration of the blocked hydroxyl group to that of a non-blocked hydroxyl group is 50% or more;

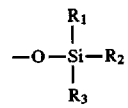
(I)

wherein $R_1$ and $R_2$, which may be the same or different, each represents an alkyl group having 1 to 18 carbon atoms, a phenyl group, an aryl group, a hydrogen atom, a chlorine atom, or a fluorine atom; and $R_3$ represents an alkyl group having 1 to 18 carbon atoms, a phenyl group, or an aryl group;

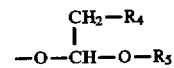
(II)

wherein $R_4$ represents a hydrogen atom or an alkyl group having 1 to 10 carbon atoms; and $R_5$ represents an alkyl group having 1 to 22 carbon atoms, which is substituted with at least one kind of an atomic group selected from the group consisting of a cycloalkyl group, an aralkyl group, an aryl group, an alkoxyl group, an alkanoyloxy group, an alkyl group having 1 to 18 carbon atoms, and a halogen atom;

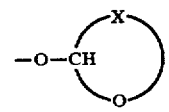
(III)

wherein X represents an alkylene group having 1 to 18 carbon atoms, which may be substituted with at least one kind of an atomic group selected from the group consisting of an alkoxyl group, an aralkyl group, an aryl group, an aryloxy group, an alkanoyloxy group, an alkyl group having 1 to 10 carbon atoms, and a halogen atom.

* * * * *